United States Patent
Hirth et al.

(10) Patent No.: US 9,958,313 B2
(45) Date of Patent: May 1, 2018

(54) SURGERY TABLE LOAD MONITORING SYSTEM

(71) Applicants: Gregory Hirth, Union City, CA (US); Sarah Burroughs, Union City, CA (US)

(72) Inventors: Gregory Hirth, Union City, CA (US); Sarah Burroughs, Union City, CA (US)

(73) Assignee: MIZUHO ORTHOPEDIC SYSTEMS, INC., Union City, CA (US)

( * ) Notice: Subject to any disclaimer, the term of this patent is extended or adjusted under 35 U.S.C. 154(b) by 191 days.

(21) Appl. No.: 15/066,907

(22) Filed: Mar. 10, 2016

(65) Prior Publication Data

US 2017/0261363 A1 Sep. 14, 2017

(51) Int. Cl.
| | |
|---|---|
| *G01G 3/142* | (2006.01) |
| *G01G 19/52* | (2006.01) |
| *A61G 13/02* | (2006.01) |
| *G01G 3/14* | (2006.01) |
| *A61G 13/10* | (2006.01) |

(52) U.S. Cl.
CPC ........... *G01G 3/1402* (2013.01); *A61G 13/02* (2013.01); *A61G 13/10* (2013.01); *G01G 19/52* (2013.01); *A61G 2203/44* (2013.01); *A61G 2203/70* (2013.01)

(58) Field of Classification Search
CPC .... A61G 13/02; A61G 13/10; A61G 2203/44; A61G 2203/70; G01G 3/1402; G01G 19/52; G01G 19/44; G01G 19/445
See application file for complete search history.

(56) References Cited

U.S. PATENT DOCUMENTS

| | | | | |
|---|---|---|---|---|
| 4,869,266 A | * | 9/1989 | Taylor .................... | A61M 1/00 177/42 |
| 7,472,439 B2 | * | 1/2009 | Lemire .................. | A61G 7/005 177/144 |
| 8,584,281 B2 | * | 11/2013 | Diel .................... | A61G 13/0036 5/601 |
| 9,316,708 B2 | * | 4/2016 | Eberler ................ | A61B 5/0555 |
| 2013/0008726 A1 | * | 1/2013 | Eberler ................ | A61B 5/0555 177/1 |

* cited by examiner

*Primary Examiner* — Randy Gibson
(74) *Attorney, Agent, or Firm* — Theodore J. Bielen, Jr.

(57) ABSTRACT

A surgery table load monitoring system utilizing a base member fixed to a surgery table support. The base member is connected to at least one platform structural member to determine load forces due to the weight of a patient on the platform structured member. Detectors are used to indicate particular stresses and generate a signal which may be employed to disable movement of the surgery table.

15 Claims, 6 Drawing Sheets

SURGERY TABLE LOAD MONITORING SYSTEM

CROSS-REFERENCES TO RELATED APPLICATIONS

The present application claims the benefit of U.S. Provisional Patent Application 62/130,784 filed 10 Mar. 2015.

BACKGROUND OF THE INVENTION

The present invention relates to a novel and useful surgery table load monitoring system.

Surgery tables are often constructed with moveable elements to allow orientation of a patient on the surgery table platform in order to allow a surgeon to perform medical procedures. For example, reference is made to U.S. Pat. No. 8,584,281 which depicts a surgery table having coordinated motion and a platform that is hinged.

In the past, various movements of a motorized surgery table have been monitored by the operator. Unfortunately, recognition of abnormal movements of a motorized surgical table by personal may be overlooked or be untimely, resulting in injury to a patient.

SUMMARY OF THE INVENTION

In accordance with the present invention a novel and useful surgery table load monitoring system is herein provided.

The monitoring system of the present invention is intended to prevent a motorized surgery table from being overloaded to the point of failure.

The system of the present invention utilizes a base member having detectors, which may be in the form of strain gauges that are mounted to a portion of the surgery table. For example, the base member may be connected to the head plate of a motorized surgery table such as that found in U.S. Pat. No. 8,584,281, which is incorporated by references, as a whole, to the present application. Each strain gauge may be in the form of a strain-bridge that is sensitive to tension/compression, and moment loading to the structure of the surgery table. Such structural components of the motorized surgery table are typically in the form of spars or the like found near the platform supporting the patient. The analog output from the strain-gage bridges feed a hardware-only comparator that may be integrated into an existing processor on the surgery table, such as a processor that monitors the loads imposed on the surgery table patient support components. In the present invention, if the load as measured by the strain-gages exceeds a preset threshold, the hardware-only circuit will remove power from motors used to position the table. In this manner, additional stress on the table is prevented. The power may be restored to the surgery table motors only when the load on the table is reduced by some means. This usually occurs when the strain-gage output falls below a preset threshold.

As heretofore discussed, the analog output from the strain-gage bridges may be fed to an existing processor or controller associated with the motorized table such as one found in U.S. Pat. No. 8,584,281. The processor will monitor and track the load on the table component, such as the head plate, to warn the user when the table is approaching a danger threshold. At this juncture, the hardware-only circuit activates and the user of the table will be prompted to reboot the table.

It may be apparent that a novel and useful surgery table load monitoring system has hereinabove described.

It is therefore an object of the present invention to provide a surgery table load monitoring system that prevents injury to the patient should the surgery table be weight overloaded in some manner.

Another object of the present invention is to provide a surgery table load monitoring system that limits its risks associated with a motorized surgery table that is not operating properly.

Another object of the present invention is to provide a surgery table load monitoring system that prevents damage to a surgery table and injury to a patient, when a software program associated with a control fails during use of the surgery table.

A further object of the present invention is to provide a surgery table load monitoring system that serves as a shut-off device due to electronic or software failures associated with the manipulating and positioning a surgery table.

Another object of the present invention is to provide a surgery table load monitoring system that includes detectors or gages that monitor tension, compression, and moment loads on spars that are associated with the support of a patient on a surgical table.

A further object of the present invention is to provide a system for monitoring loads on a surgery table in order to interrupt power to the motors manipulating such surgery table according to a system of zone limits or thresholds for particular load forces.

Another object of the present invention is to provide a surgery table load monitoring system which is easily integrated into a known processor associated with a motorized surgery table.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
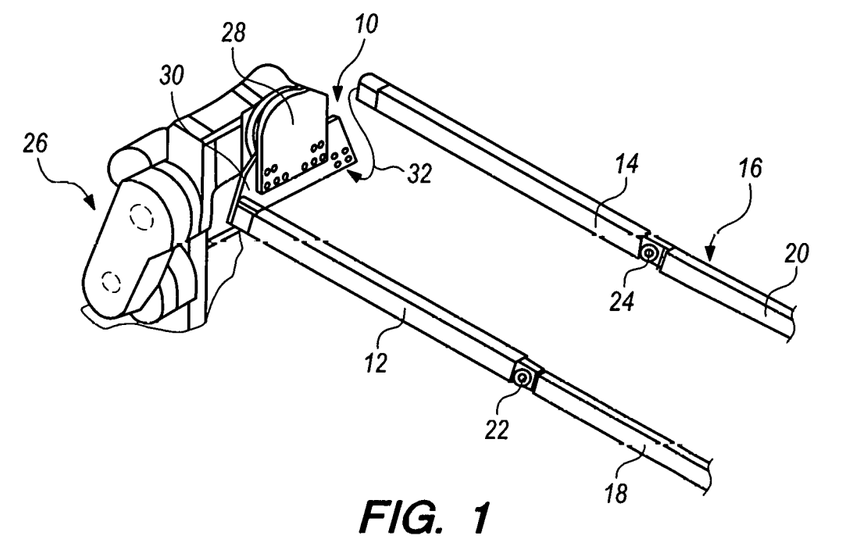
FIG. 1 is a prospective view of a portion of a motorized surgery table having a pair of spars connectable to the base member of the present invention.

The surgery table load monitoring system is indicated by reference character 10 to show the physical components of the same as a whole. With reference to FIG. 1, it may be seen that spars 12 and 14 are connected to spars 18 and 20 by hinges 22 and 24 in a surgery table 16. Motor mechanism 26, shown partially in FIG. 1, operates the movement of spars 12, 14, 18, and 20 to produce hinged-up, hinged-down, lateral tilt, Trendelenburg, reverse Trendelenburg, and like positions of surgery table 16. Such motor mechanism is fully described in U.S. Pat. No. 8,584,281 heretofore noted. A patient platform (not shown) may also be employed to lie against spars 12, 14, 18, and 20 and may be of conventional construction.

Surgery table 16 includes a head plate 28. A base member 30 of system 10 lies against and is connected to head plate 28. Spar 12 and hinge linked spar 18 are shown as being linked to base member 30. Spar 14 and hinged connected spar 20 are indicated on FIG. 1 as being linked to base member 30 by directional arrow 32.

Figure 2:
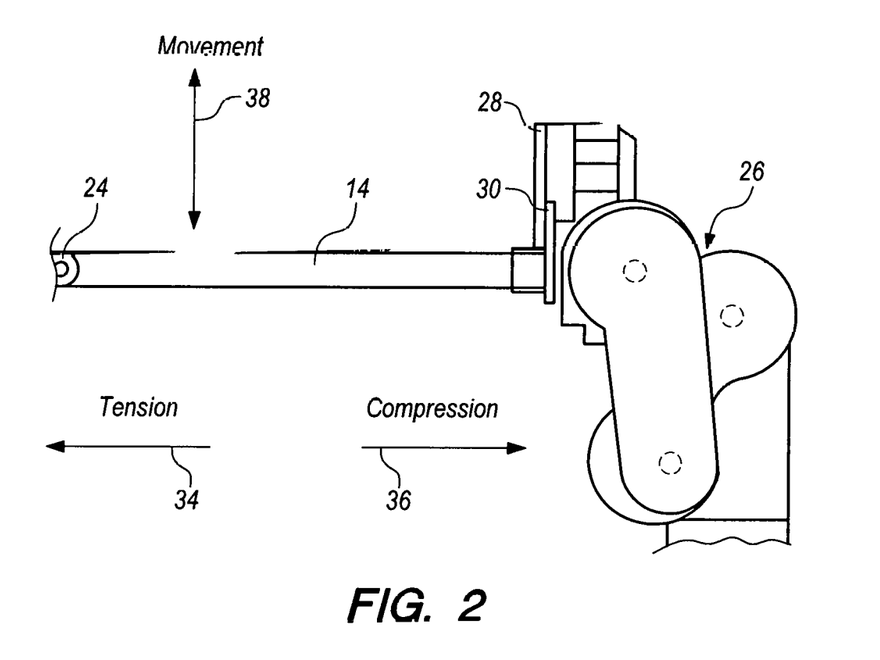
FIG. 2 is a partial side elevational view of a motorized surgery table utilizing the present invention in which the forces on a spar connected to the base member of the present invention are delineated.

FIG. 2, illustrating spar 14 as being connected to base member 30, represents the particular loads that may be imposed upon spars 12, 14, 18, and 20, as well as any platform supported by such spars. For example, tension, compression, and moment or torque forces may act on spars 12, 14, 18 and 20, and are indicated by force arrows 34, 36, and 38, respectively.

Figure 3A:
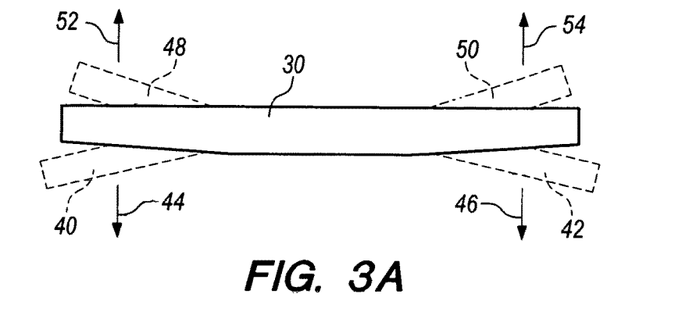
FIGS. 3A & 3B are schematic views of the base member of the present invention showing various strains thereupon due to forces on the spar or other supports for the patient of a motorized surgery table.
Figure 3B:
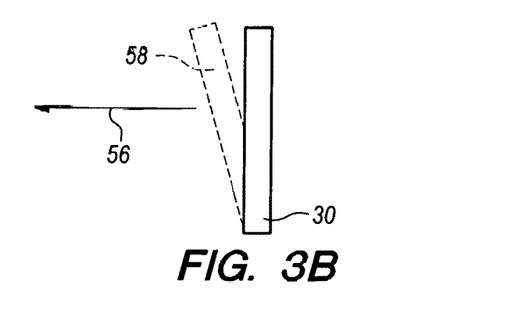

Turning to FIGS. 3A & 3B, it may be observed that schematic representations of base member 30 are shown. FIG. 3A represents a top plan view while FIG. 3B represents a right side view of base member 30. End portions 40 and 42 on FIG. 3A, in dashed line format, indicate the exaggerated deformation of base member 30 under tension, directional arrows 44 and 46. End portions 48 and 50 of base member 30, shown in dashed format, represent the exaggerated movement of base member 30 under compression, directional arrows 52 and 54. FIG. 3B represents the moment force, directional arrow 56, exerted on base member 30 and the exaggerated deformation of base member 30 is shown by dashed-line FIG. 58. It should be understood, that the movements depicted in FIGS. 3A and 3B originate with forces exerted on spars 12, 14, 18, and/or 20 due to the patient placed on surgery table 16 and manipulated for surgical procedures.

Figure 4:
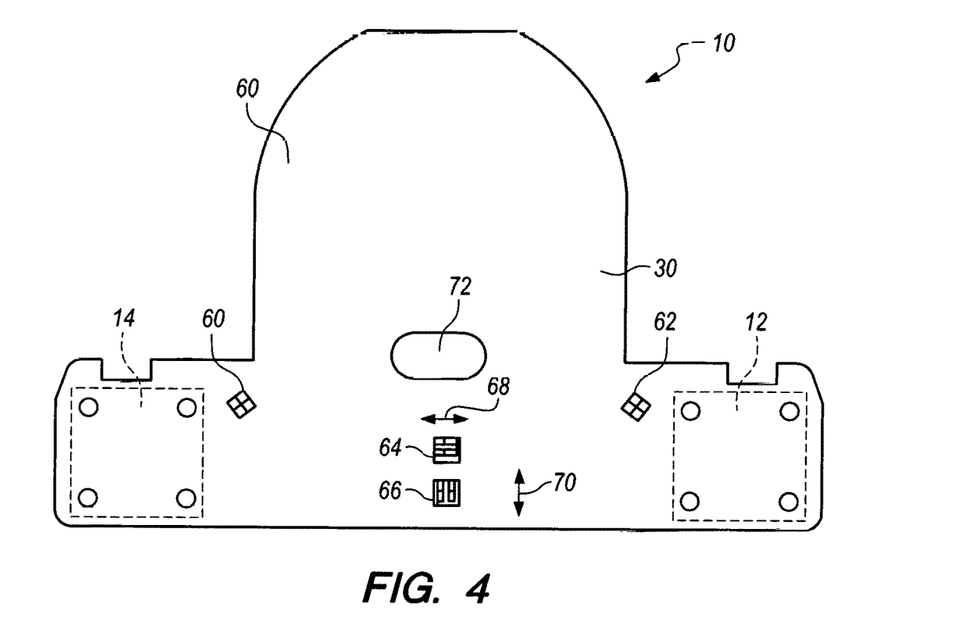
FIG. 4 is a front elevational view of the base member of the present invention.

FIG. 4 illustrates base member 30 that lies against head plate 28. It should be noted that base member 30 may be located in other areas of surgery table 16 such as a foot plate, a support structure, and the like, to obtain a reading of the forces on spars 12, 14, 18, and/or 20. Base member 30 includes a surface 60 supporting moment strain gauges 60 and 62, as well as tension/compression strain gauges 64 and 66. Arrows 68 and 70, indicate the strain direction for strain gauges 64 and 66, respectively. Oval portion 72 denotes placement of electrical and electronic components such as, amplifiers and the like which are linked to strain gauges, 60, 62, 64, and 68, and which will be further discussed hereinafter.

Figure 5:
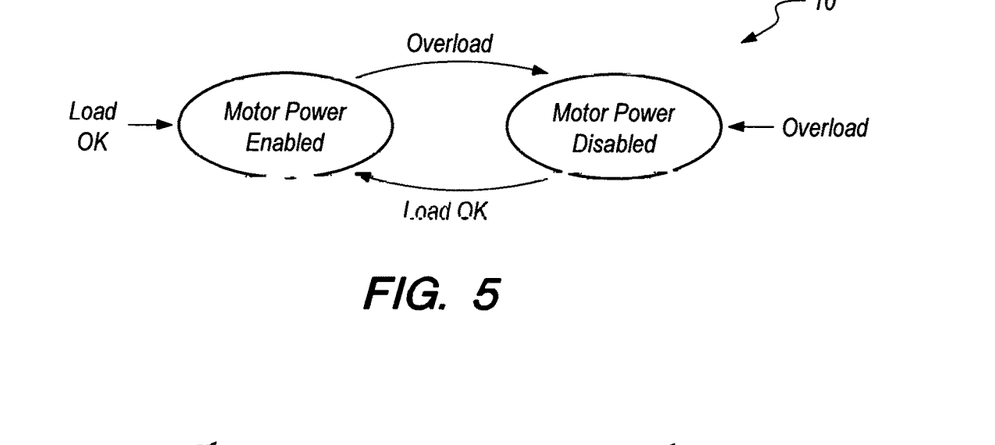
FIG. 5 is a block diagram showing overall loading on the surgery table patient support as well as the enabling and disabling of the motor power.

FIG. 5 shows the overall operation of system 10 in which the power to motor mechanism 26 of table 16, FIG. 1, is either enabled or disabled according to the measurements of the loads on spars 12, 14, 18, and/or 20 detected by strain gauges 60, 62, 66, and/or 68. To monitor the loads placed on spars 12, 14, 16, 18, and/or 20 during the normal operation of motorized surgery table 16, limits as to the quantity of tension, compression and moment forces have been established. In other words, the analog outputs from strain gauges 60, 62, 64, and 66 are fed to a controller processor, the details of which will be shown hereinafter. The processor essentially monitors and tracks the load on linked head plate 28, FIG. 1, and warns the user of table 16 when it is approaching a threshold at which power to motor 26 is disabled. The user will then be prompted to adjust such load on table 16 and reboot the table when it is possible to do so.

Figure 6:
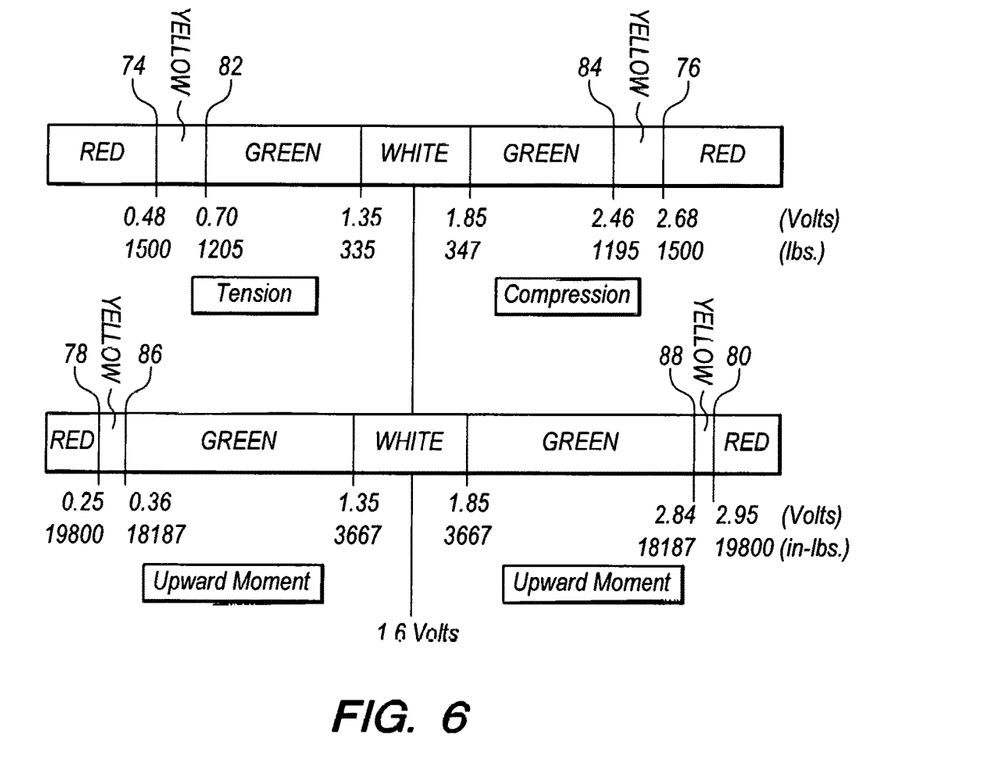
FIG. 6 is a diagram depicting the zone limits established for the various forces loaded/on a motorized surgery table.

FIG. 6 represents the zone limits of tension, compression, upward moment and downward moment forces on spars 12, 14, 18, and/or 20. As shown in FIG. 6, zones are indicated by the colors white, green, yellow, and red. Values in the green or white zones are considered safe, based on the table operating normally where there is no fault condition or lack of coordinated motion by the motorized power, partially shown in FIG. 1 as motor mechanism 26. FIG. 6 also indicates typical measured voltages related to the quantity of tension, compression, upward moment and/or downward moment forces, shown in pounds or, in the case of moment forces, in inch-pounds. Values found in the yellow zones measured by strain gauges 60, 62, 64, and/or 66 indicate the approach of a situation where the power to motor 26 will be disabled according to FIG. 5. Vertical lines of demarcation, 74, 76, 78 or 80, mark the boundaries between yellow zones and red zones, the latter zone triggering a disabling of the motor 26 power to table 16. The measurements obtained from strain gauges 60, 62, 64, and 66 will also, determine thresholds 82, 84, 86, or 88 that allows table 16 to return to a green or white zone after being in a yellow zone. Also, a point may be determined at which disconnecting spars 12, 14, 18, and/or 20 for the purposes of storing table 16 is considered too difficult or dangerous. It should also be realized that analog signals generated by strain gauges 60, 62, 64, and 66 will be converted to binary signals for use in the electronic components associated with the system 10 of the present invention, which will be discussed hereinafter.

Figure 7:
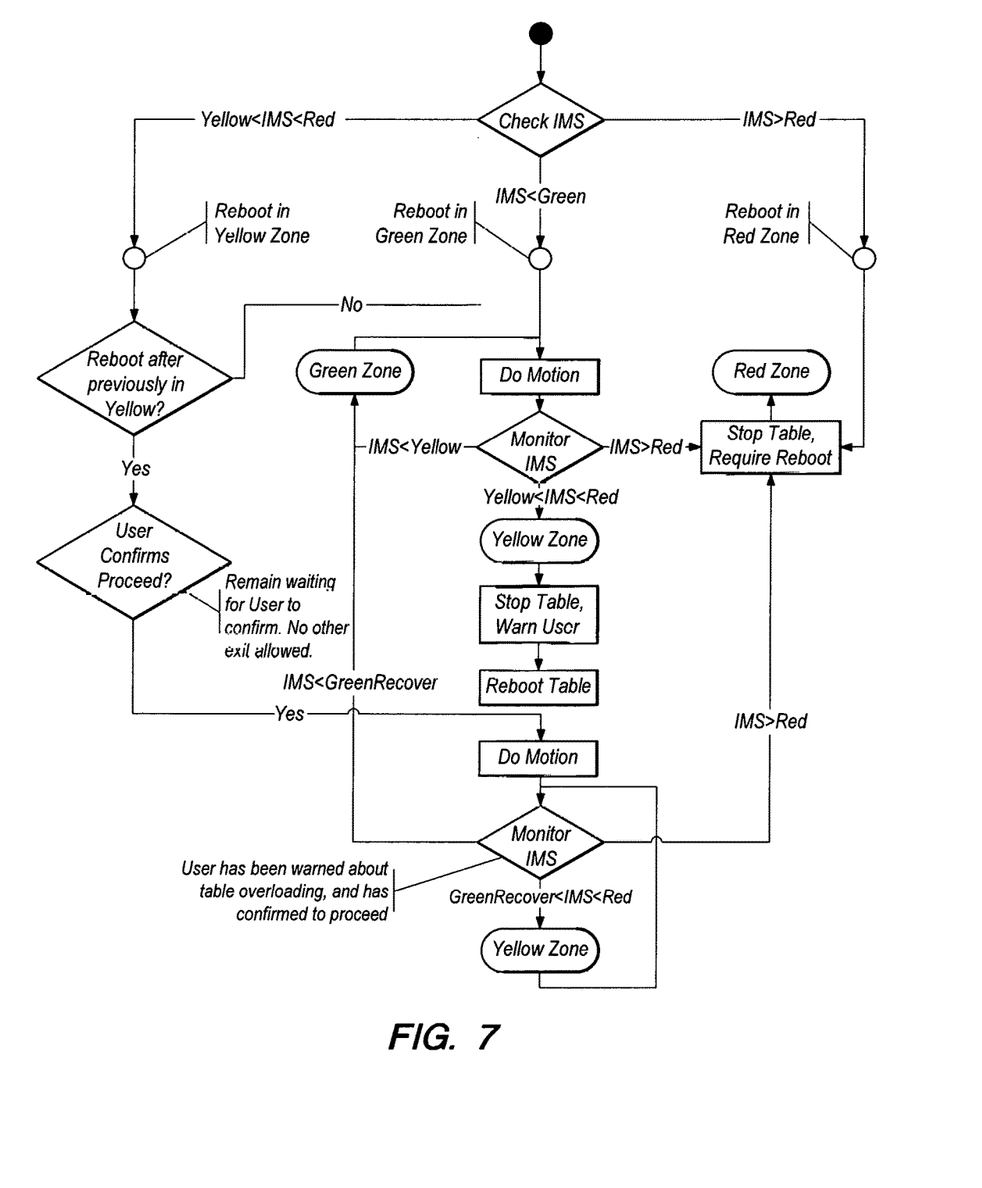
FIG. 7 is a diagram indicting the operation of the software associated with the system of the present invention.

FIG. 7 diagrams the operation of the software associated with the system 10 of the present invention, identified by "IMS". In essence, the software acts in accordance with the measurements obtained from strain gauges 60, 62, 64, and/or 66. If any of the strain gauges shows a load on table greater than the yellow threshold, vertical lines 82, 84, 86 and 88 on FIG. 6, the software will display and "overload" error and ask the user to reboot the motorization of table 16. In other words, table 16 must be rebooted before any motion of spars 12, 14, 18, and 20 is permitted. If after reboot, table 16 still shows a load greater than the yellow limits indicated by vertical lines 82, 84, 86, and 88 of FIG. 6, an overload message will be displayed in a particular electronic component by the software. Such error message will persist until acknowledged by the user after such acknowledgment, the display component will return to its home screen and the table will be allowed to move. For example, the hand pendant depicted in U.S. Pat. No. 8,584,281 would suffice in this regard.

Should any of the signals from strain gauges 62, 64, 66, and/or 68 indicate that a voltage value is greater than any of the red threshold lines of demarcation, 74, 76, 78, and/or 80, the power will be cut to the motor mechanism 26 of table 16, an error message will be displayed on an electronics components screen, and the error message will persist until the user reboots table 16 or the offending force is removed from table 16. In addition, the software provides means to detect the state where any of the strain gauges, 60, 62, 64, and/or 66 are not connected to system 10. Again, such error message will be displayed. A momentary switch may be provided to override the disabling effects of the software on the motor mechanism of table 16 for the purposes of servicing table 16.

Figure 8A:
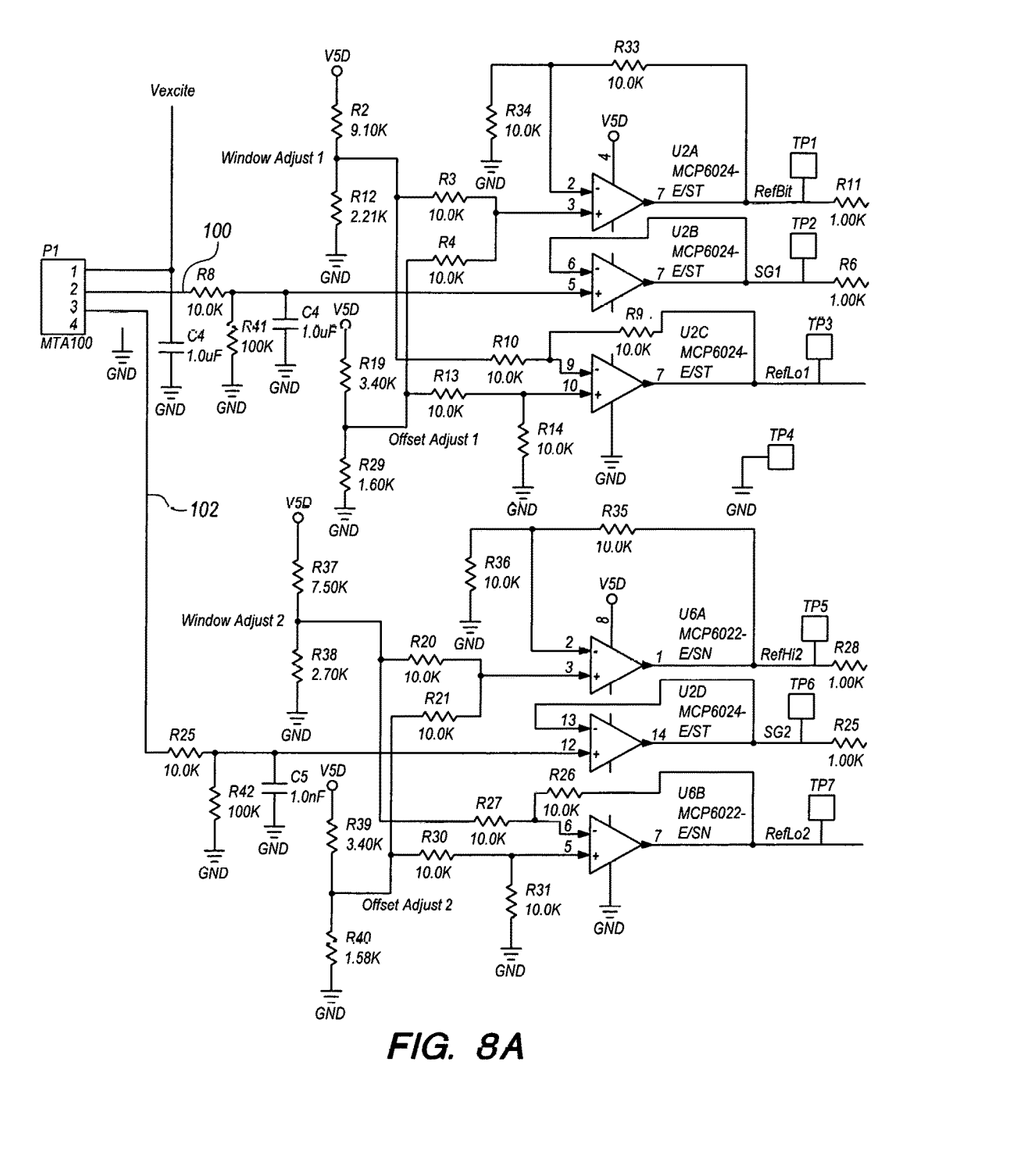
FIGS. 8A and 8B are contiguous circuit diagrams with overlapping elements showing the operation of the signals generated by the detectors mounted on a base member of a motorized surgery table.
Figure 8B:
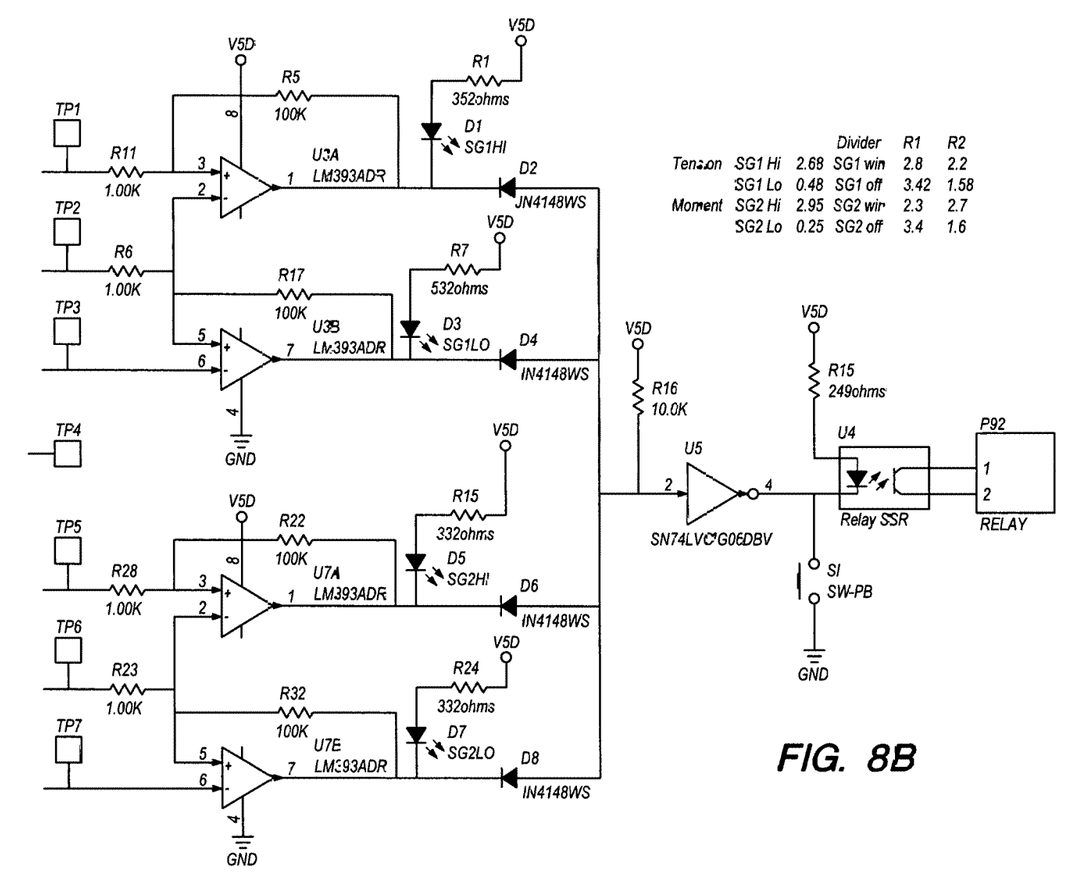

FIGS. 8A and 8B detail the circuitry of a controller involved with the operation of system 10 of the present invention. The strain gauges 60, 62, 64, and 66 inputs comprise sensors that are fed into the circuit of FIG. 8A. P3 shows such inputs where the numeral 1 represents the excitation voltage (Vexcite), numeral 2 represents the tension/compression signal 100, numeral 3 represents the moment signal 102, and numeral 4 denotes a ground. C4 serves as a filter for Vexcite, the power supply. Following the path of tension/compression signal 100, R8 and C3 comprise a low pass filter. R41 is a pull-down resistor for signal 100. R2, R3, R4, R12, and R34 are voltage dividers for U2A. R10, R13, R14, R19, and R28 serve the same purpose for U2C. Fixing the voltage value for U2A and U2C would obviate the need for such voltage dividers. Amps U2A, U2B, and U2C represent the high point voltage, the buffering voltage, and the low point voltage, respectively. Thus, U2A and U2C serve as trip points for the input from strain gauges 60, 62, 64, and 66. Comparators U3A and U3B represents the high and low limits for operation of the motorized mechanism 26 of surgery table 16. In other words, the U2B analog voltage signal SG1 is compared to the outputs of U2A and U2C at U3A and U3B. U3A receives a plus-side signal from U2A and a minus-side signal SG1 from U2B. Likewise, U3B receives a plus-side signal SG1 from U2B and a minus-side signal from U2C. D1 and D3 will provide visual alerts when the high or low Ref. signals, RefHi or RefLo, are exceeded by SG1, respectively. D2 and D4 are wired "or" gates that trigger the U5 buffer to relay U4. U4 is a power supply relay linked to motor relay P92, that intercepts power to motor 26. SW-PB switch S1 is the manual override switch to reactivate motor 26. The components of the circuitry of FIGS. 8A and 8B with respect to the tension/compression signal 100, also describes the components associated with the SG2 signal emanating from U2D, namely the moment signal 102 from table 16.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An apparatus for monitoring forces applied to a medical table, comprising:
   a patient support;
   a base member, said base member being directly connected to said patient support of the medical table structure, said base member;
   at least a first strain gauge and a second strain gauge, said first and second strain gauges being mounted on said base member, said first strain gauge possessing a different strain direction from said second strain gauge, said first strain gauge detecting the quantity of a first force on said base member deriving from movement of said base member in a first direction by said connected patient support, said second strain gauge detecting the quantity of a second force on said base member, deriving from movement of said base member in a second direction by said connected patient support, said first and second strain gauges generating first and second output signals, respectively;
   a motor mechanism directly connected to said base member, said motor mechanism positioning said base member and said connected patient support; and
   a controller, said controller receiving said first and second output signals from said first and second strain gauges, respectively, and determining the functioning of said motor mechanism.

2. The apparatus of claim 1 in which said quantity of said first force detected by said first strain gauge comprises compression on said base member, and said quantity of said second force detected by said second strain gauge comprises tension on said base member.

3. The apparatus of claim 1 which further comprises a third strain gauge mounted on said base member, said third strain gauge detecting the quantity of a third force on said base member deriving from movement of said base member in a third direction by said patient support, said third strain gauge generating a third output signal.

4. The apparatus of claim 3 in which said quantity of said third force detected by said third strain gauge comprises torque on said base member.

5. The apparatus of claim 1 in which said patient support includes a first spar and a second spar, said first and second spars being directly linked to said base member.

6. The apparatus of claim 5 in which said first force detected by said first strain gauge comprises compression on said base member, and said second force detected by said second strain gauge comprises tension on said base member.

7. The apparatus of claim 5 which further comprises a third strain gauge mounted on said base member, said third strain gauge detecting the quantity of a third force on said base member deriving from movement of said base member in a third direction by said patient support, said third strain gauge generating a third output signal.

8. The apparatus of claim 7 in which said third force detected by said third strain gauge comprises torque on said base member.

9. The apparatus of claim 7 in which said medical table structure includes a patient head support and said base member is affixed said head support.

10. The apparatus of claim 1 in which said controller comprises a comparator receiving any one of said first and second output signals, and further receiving a reference signal, said comparator generating a control signal, and which further comprises a relay linked to said motor mechanism, said control signal disabling said motor mechanism via said relay when any one of said first and second output signals exceeds said reference signal.

11. The apparatus of claim 10 in which said first force detected by said first strain gauge comprises compression on said base member, and said second force detected by said second strain gauge comprises tension on said base member.

12. The apparatus of claim 10 which further comprises a third strain gauge mounted on said base member, said third strain gauge detecting the quantity of a third force on said base member deriving from movement of said base member in a third direction by said patient support, said third strain gauge generating a third output signal.

13. The apparatus of claim 12 in which said third force detected by said third strain gauge comprises torque on said base member.

14. The apparatus of claim 10 in which said medical table structure includes a patient head support and said base member is affixed said head support.

15. The apparatus of claim 12 in which said comparator receives any one of said first, second, and third output signals and generates a control signal disabling said motor mechanism via said relay when any one of said first, second, and third output signals exceeds said reference signal.

\* \* \* \* \*